M. C. SCHWEINERT.
TIRE DEFLATING MACHINE.
APPLICATION FILED FEB. 4, 1919.

1,438,464.

Patented Dec. 12, 1922.

WITNESS:
René Breine

INVENTOR:
Maximilian Charles Schweinert
By Attorneys,

Patented Dec. 12, 1922.                                                                                           1,438,464

UNITED STATES PATENT OFFICE.

MAXIMILIAN CHARLES SCHWEINERT, OF WEST HOBOKEN, NEW JERSEY.

TIRE-DEFLATING MACHINE.

Application filed February 4, 1919. Serial No. 275,036.

*To all whom it may concern:*

Be it known that I, MAXIMILIAN CHARLES SCHWEINERT, a citizen of the United States of America, residing in West Hoboken, county of Hudson, and State of New Jersey, have invented certain new and useful Improvements in Tire-Deflating Machines, of which the following is a specification.

This invention relates to a tire deflating machine, and has for its primary object to provide mechanism for positively and thoroughly expelling air from a pneumatic tire.

In the manufacture of pneumatic tires or tubes, it is a more or less difficult matter to expel all of the fluid contents preparatory to marketing, and one of the objects of this improvement is to accomplish this purpose in a practicable manner, while also insuring thorough exhausting of the air.

An additional purpose of the invention is to provide a simple mechanism characterized by few parts and lending itself readily to rapid operation.

The invention comprises generally a mechanical expanding means which is brought into contact with the inner periphery of a tire and forced outwardly against said periphery to cause the walls of the tire to collapse. At the same time, provision is made for opening the tire valve and holding it open while the air is expelled. One form of the mechanism includes a series of members, which are movable radially with reference to a frame, and thus expanded into engagement with a substantial part of the inner periphery of a tire or tube.

To these and other ends the invention consists in certain other details and combinations of parts as will be hereinafter more fully described and pointed out in the claims at the end of the specification.

Figure 1:
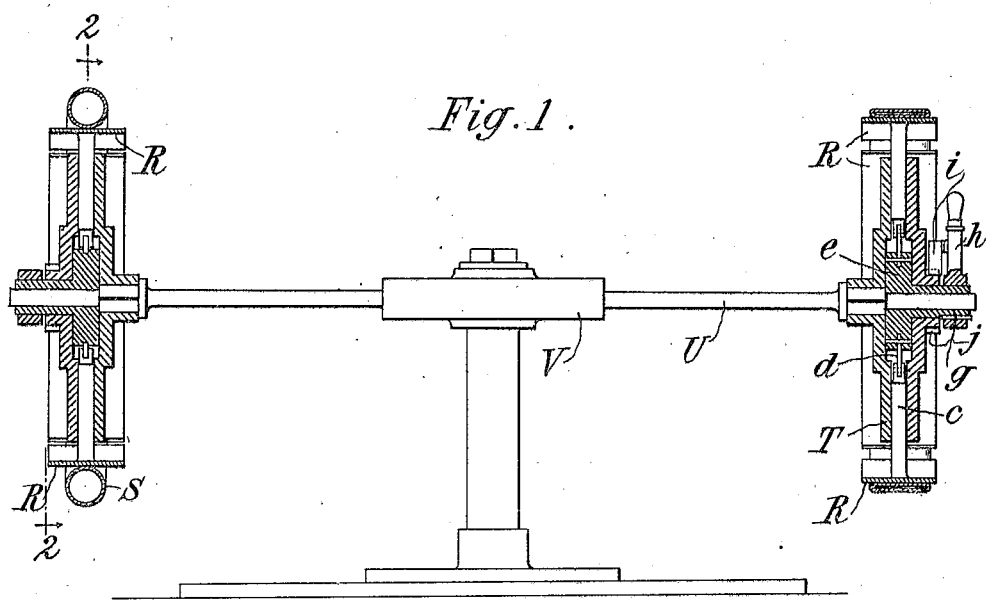
Figure 2:
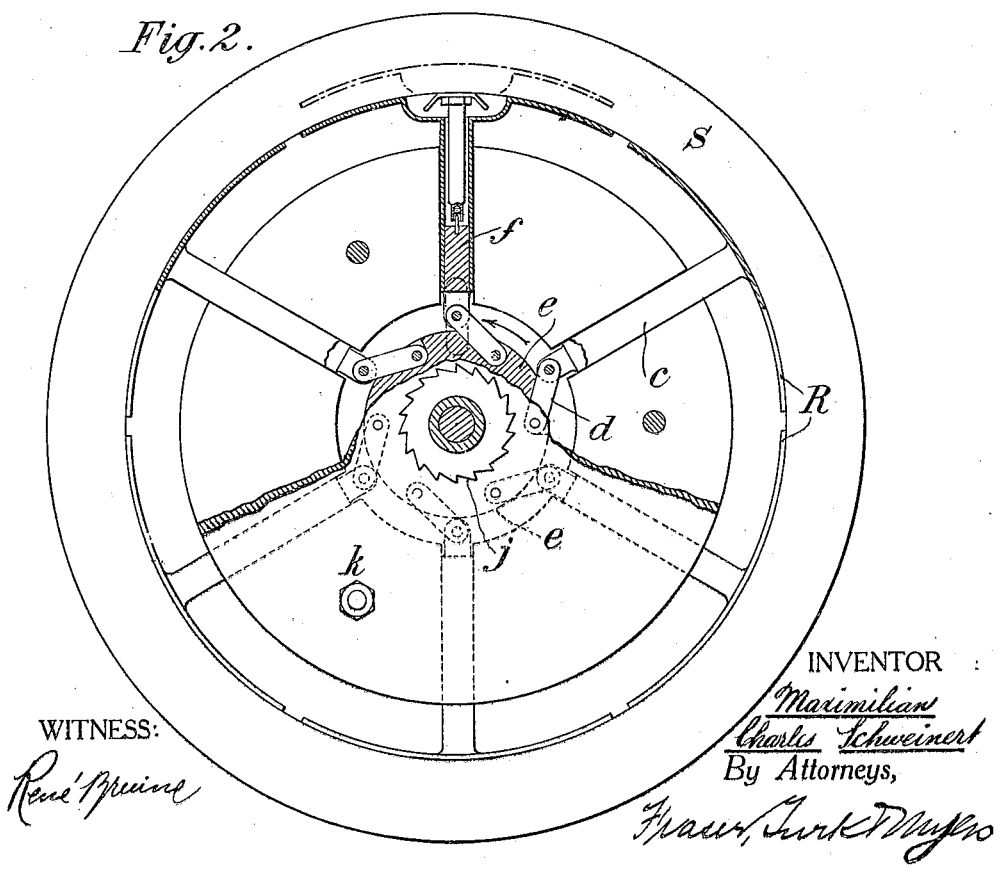

Figure 1 is a side elevation, partly in section, illustrating a practical embodiment of the invention, and Fig. 2 is a vertical sectional view on line 2—2 of Fig. 1.

The present structure is an improvement upon suction deflating devices, and is intended to depend primarily upon mechanical pressure applied to the inner periphery of a tube. A preferred way of accomplishing this consists in the use of a series of arc shaped plates, radially movable with reference to a common centre, and forming, when expanded, a wide, nearly completed annulus. The plates press against the pneumatic tube or casing, flattening it out, more or less evenly, all around, and by holding the valve open, the air within can be quickly expelled. There are various structures by which this result may be attained, and I have illustrated, by way of example, one preferred form, in which R designates independently expansible supporting members or plates, each of which is mounted on a rod *c*, connected by means of a link *d* with a rotary disk *e*. There is also afforded a valve-opening member *f* which is governed by the disk *e* through a similar link *d*. The disk *e* carries a sleeve *g* to which is fixed the operating handle *h*. The latter is turned to expand the members R and valve-opening member F against the inner periphery of a tire S, and the lever *h* is held in adjusted position by pawl *i* engaging ratchet teeth *j* upon a fixed plate *k*. The disk *e* and rod *c* are suitably disposed in a frame or carrier consisting of side plates T, and the entire structure is mounted on an arm U extending from a central web V which is preferably rotary to present the different expanders to an operator successively, for positioning or removing a tire therefrom. The expanding members R are preferably in the form of arc-shaped plates which, when expanded against the inner periphery of a tire, flatten the same and force all the air out through the open valve, but this result may be equally well accomplished by other constructions.

While the invention is described herein with reference to a particular embodiment, it is not limited to the specific mechanism shown or described, since other modifications may readily be had without departing from the spirit and underlying novelty of the improvement, or the scope of the following claims.

I claim as my invention:—

1. A pneumatic tire tube deflating mechanism comprising an expansible means having a substantially circular contour adapted to be arranged adjacent to and expansible against the inner periphery of a tube to cause its walls to collapse and means for varying the effective diameter of the expansible means without destroying its circular configuration.

2. A pneumatic tire tube deflating mechanism comprising an expansible support having a substantially circular contour on which a tube can be mounted, the support being arranged adjacent the inner periphery of the tube and expansible thereagainst without substantially varying its circular contour to cause the walls of the tube to collapse, means for receiving a valve stem connected to said tube and means for actuating the expansible means.

3. A pneumatic tire tube deflating mechanism comprising an expansible support consisting of circularly arranged elements on which a tube can be mounted, the support being arranged adjacent the inner periphery of the tube and expansible thereagainst to cause the walls of the tube to collapse while maintaining the circular arrangement of the elements, means for receiving a valve stem connected to said tube and holding open the check valve contained therein, and means for actuating the expansible means.

4. A pneumatic tire tube deflating mechanism comprising a frame and a plurality of members movable radially outwardly with reference to the frame into engagement with the inner periphery of a tube to cause its walls to collapse, means for receiving a valve stem connected to said tube and holding open the check valve contained therein, and means for actuating the movable means outwardly.

5. A pneumatic tire tube deflating mechanism comprising a frame, a series of members associated with said frame and movable radially with respect to a common center, into engagement with the inner periphery of a tube mounted on said frame, means for holding open the check valve of said tube and means for actuating the members radially.

6. A pneumatic tire tube deflating mechanism comprising a frame, a series of expanding plates carried on radially movable rods associated with said frame and adapted to be moved into engagement with the inner periphery of a tube mounted on the frame, means for receiving a valve stem connected with said tube and for holding open the check valve contained therein, and means for actuating said rods outwardly.

7. A pneumatic tire tube deflating mechanism comprising a frame, a series of expanding plates carried on radially movable rods associated with said frame and adapted to be moved into engagement with the inner periphery of a tube mounted on the frame, means for receiving a valve stem connected with said tube and for holding open the check valve contained therein, and means for actuating said rods outwardly, said last named means comprising a rotary member connected to said rods.

In witness whereof, I have hereunto signed my name.

MAXIMILIAN CHARLES SCHWEINERT.